Figure 1:
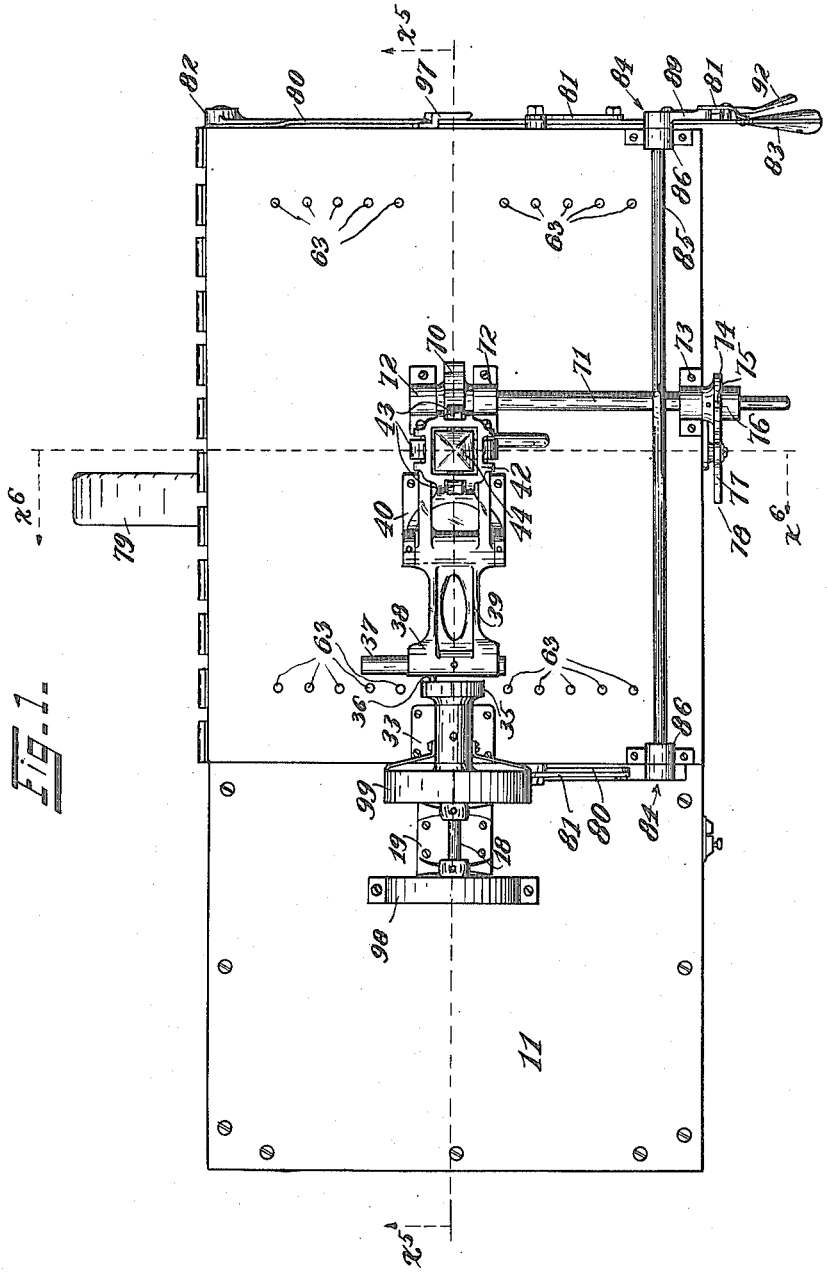

R. R. PAGE.
ETCHING APPARATUS.
APPLICATION FILED DEC. 12, 1914.

1,152,435.

Patented Sept. 7, 1915.
7 SHEETS—SHEET 1.

Witnesses:
Chas. E. Whiteman
H. D. Penney

Inventor:
Robert R. Page,
By his Atty: F. H. Richards.

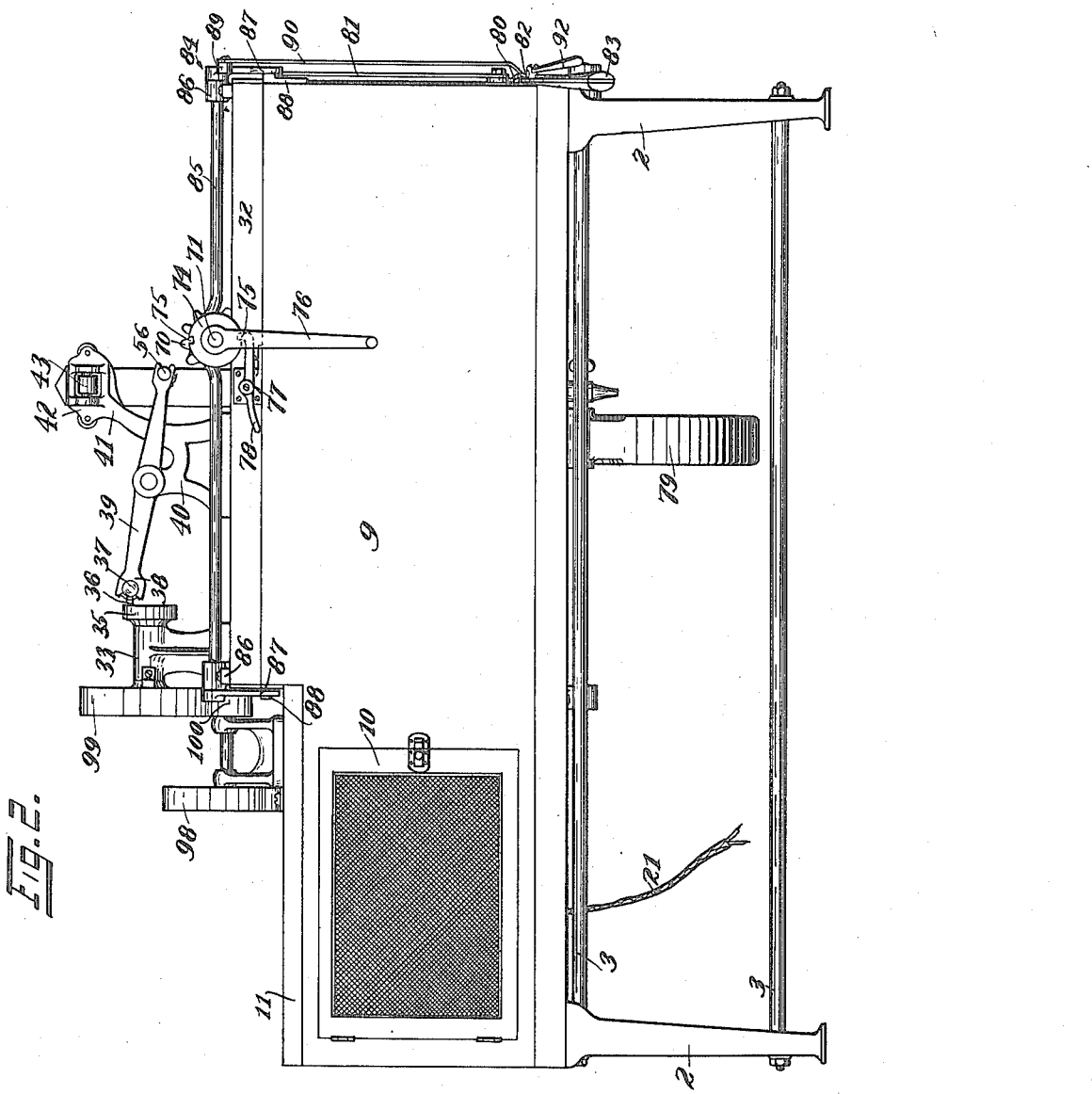

R. R. PAGE.
ETCHING APPARATUS.
APPLICATION FILED DEC. 12, 1914.

1,152,435.

Patented Sept. 7, 1915.
7 SHEETS—SHEET 3.

Witnesses:
Chas. E. Whiteman
H. D. Penney

Inventor:
Robert R. Page,
By his Att'y: F. H. Richards

R. R. PAGE.
ETCHING APPARATUS.
APPLICATION FILED DEC. 12, 1914.
1,152,435.
Patented Sept. 7, 1915.
7 SHEETS—SHEET 4.
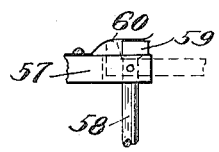
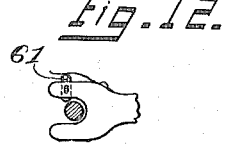
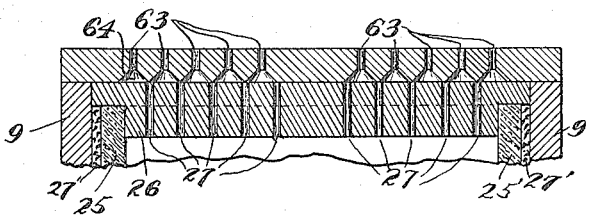
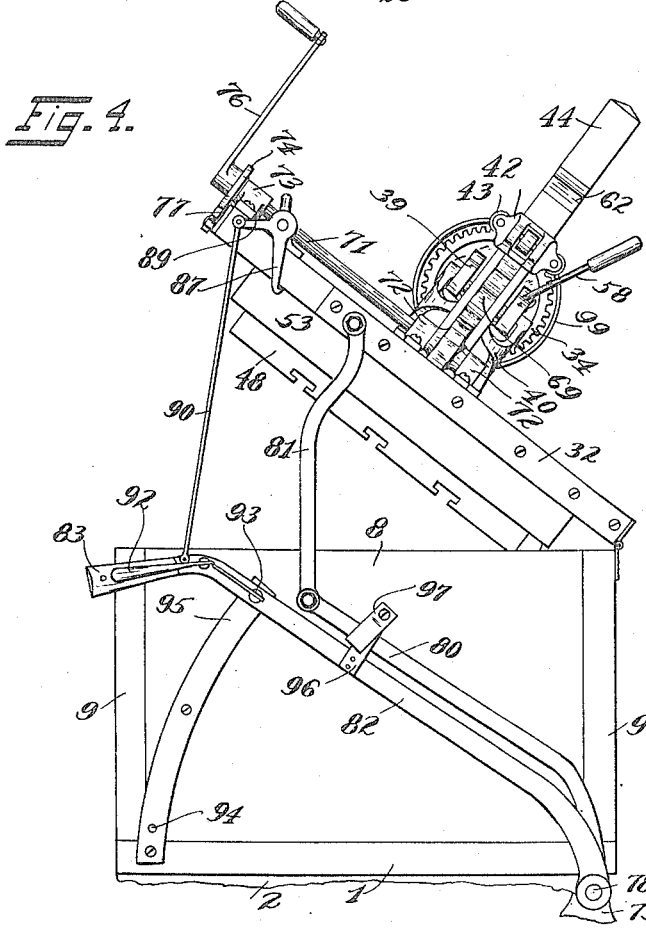
Witnesses:
Chas. F. Whiteman
H. D. Penney
Inventor:
Robert R. Page,
By his Atty: F. A. Richards

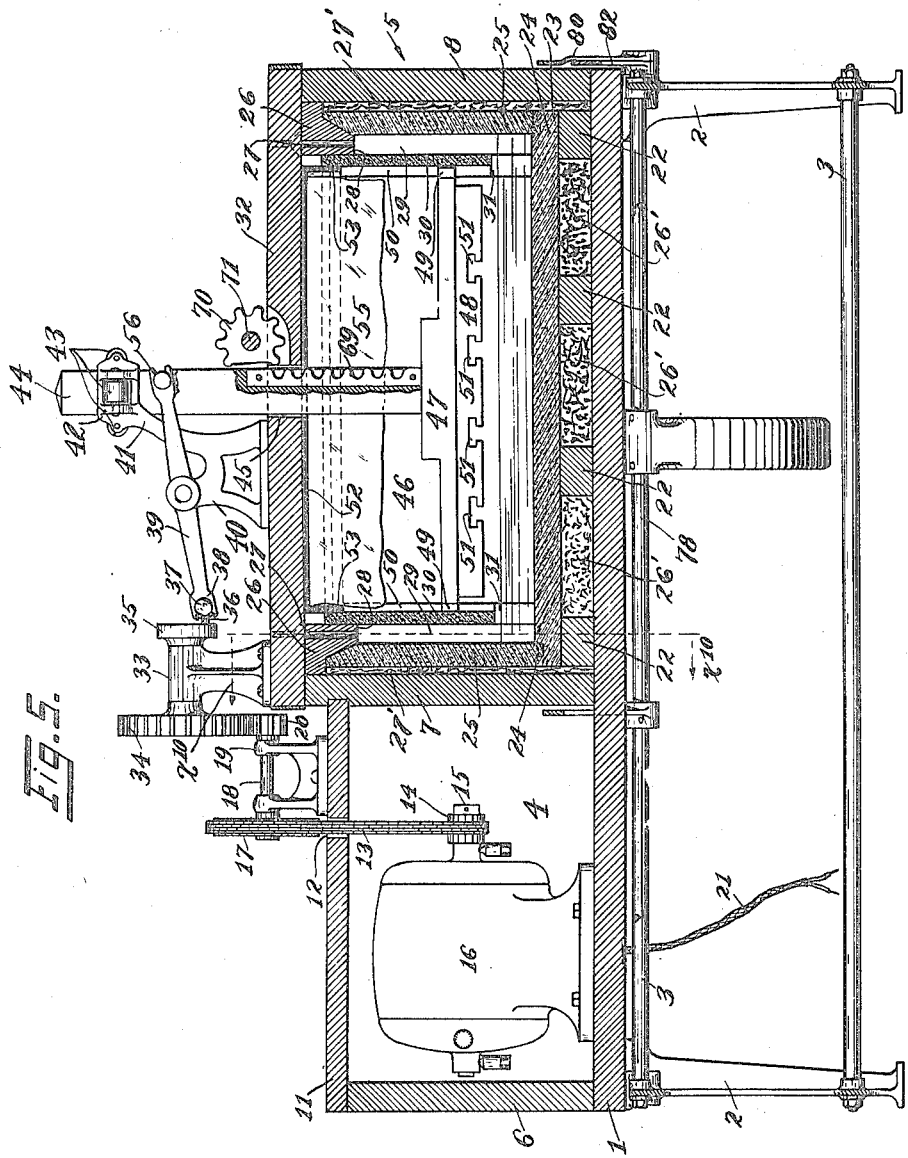

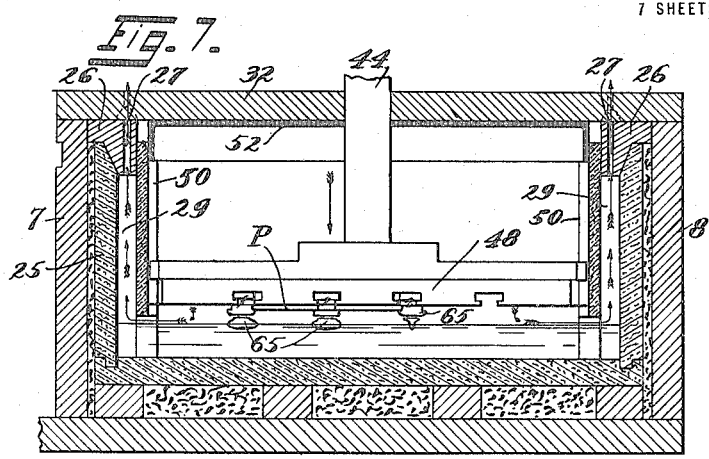
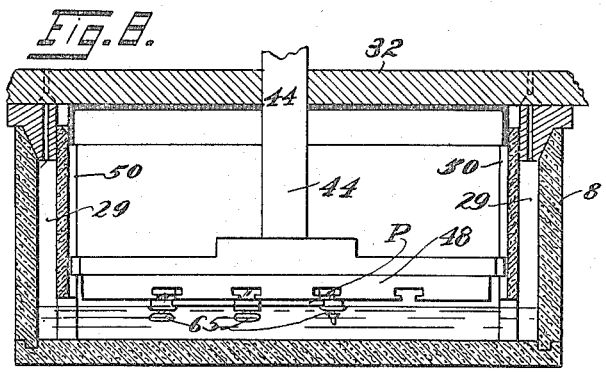
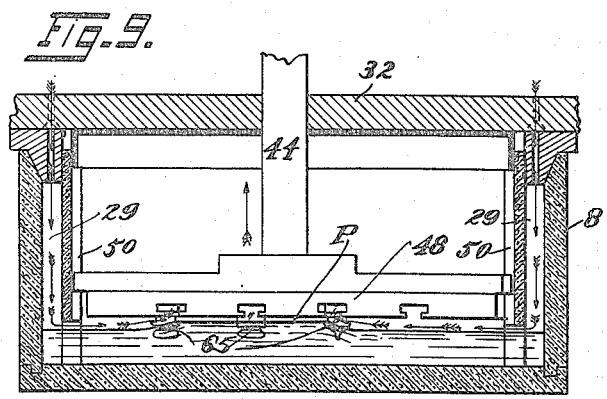

R. R. PAGE.
ETCHING APPARATUS.
APPLICATION FILED DEC. 12, 1914.

1,152,435.

Patented Sept. 7, 1915.
7 SHEETS—SHEET 7.

Witnesses:
Chas. E. Whitman
H. D. Penney

Inventor:
Robert R. Page,
By his Atty:

UNITED STATES PATENT OFFICE.

ROBERT R. PAGE, OF BROOKLYN, NEW YORK.

ETCHING APPARATUS.

1,152,435. Specification of Letters Patent. Patented Sept. 7, 1915.

Application filed December 12, 1914. Serial No. 876,770.

*To all whom it may concern:*

Be it known that I, ROBERT R. PAGE, a citizen of the United States, residing in Brooklyn, in the county of Kings and State of New York, have invented certain new and useful Improvements in Etching Apparatus, of which the following is a specification.

This invention relates to a process for preparing metallic and grained plates for printing after the picture to be printed has been produced on the plate, and the apparatus for carrying out such process. In this art, a plate preferably composed of copper is provided with a sensitive coating, and after the picture has been produced on such coating, then the plate is repeatedly dipped in a solution of iron perchlorid whereby the unaffected coating is washed off, and the copper surface where exposed is etched by the action of the iron perchlorid with such copper, and since the exposed copper surface may be extensive in part of the picture and in other parts almost imperceptibly small, the etching action will clearly define and bring out the affected parts of the coating which is very desirable in order to clearly reproduce such picture in printing. Plates have been prepared in a manner similar to the forementioned process according to my prior Patent No. 1,013,892, issued January 9, 1912.

The main object of the present invention is to provide such a process whereby the liquid, into which the plate is immersed or rather with which the plate comes in contact, may be quickly separated from the plate, so as to facilitate the quick reciprocation of the plate into and out of contact with the liquid. To this end, a free flow of gaseous substance such as air is permitted to pass into and out of the chamber in which the etching action takes place so that such gaseous substance will be in position to immediately fill up the vacuum tended to be created when the plate is withdrawn from the liquid, and to flow out of the path of movement when the plate approaches the liquid.

Another object of the invention is to provide an apparatus for carrying out this new process comprising novel air flues which will permit the passage of air but prevent any of the liquid contents being splashed out of the etching chamber.

Still another object of the invention is to provide a process for treating a metallic plate consisting in repeatedly dipping the sensitized plate in a vertical direction into a bath so that the reagents will not be permitted to eat under the outer coating, thus to undercut it as is the case when the plate is swung from one inclined position to another; and at the same time that this vertically reciprocatory action takes place, to permit the free passage of air into and out of the treating chamber so as to facilitate the quick shearing off of the liquid from the plate by the inflowing air when the plate rises, and to permit the unhampered descent of the plate due to the quick outflow of the air from such treating chamber when the plate descends.

Still other objects of the invention are to provide a non-corrosive chamber which is immune to the attack of the chemical actions taking place therein; to provide a cover for such chamber; to provide a movable support on said cover for supporting the plate to be printed; to provide means for preventing any dripping of the adhering liquid when the cover is being raised; to provide actuatable means on the cover for reciprocating the movable support; and to provide connecting means for connecting the actuatable means on the cover with power in order to operate said actuatable means by such power.

These and other features, capabilities and advantages of the invention will appear from the subjoined detailed description of one specific embodiment thereof illustrated in the accompanying drawings in which—

Figure 6:
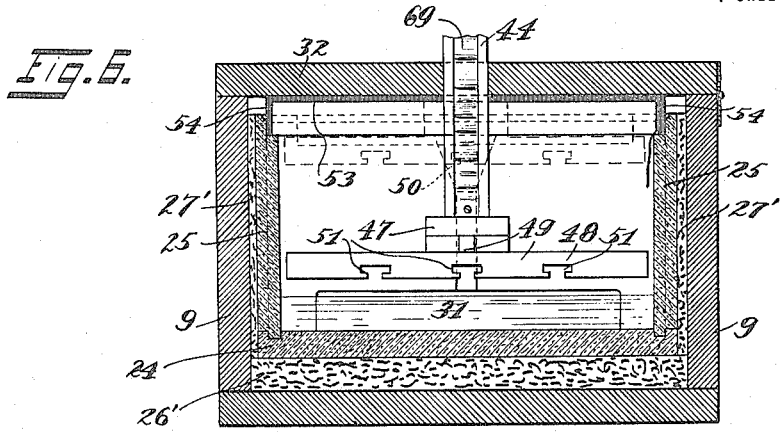
Figure 3:
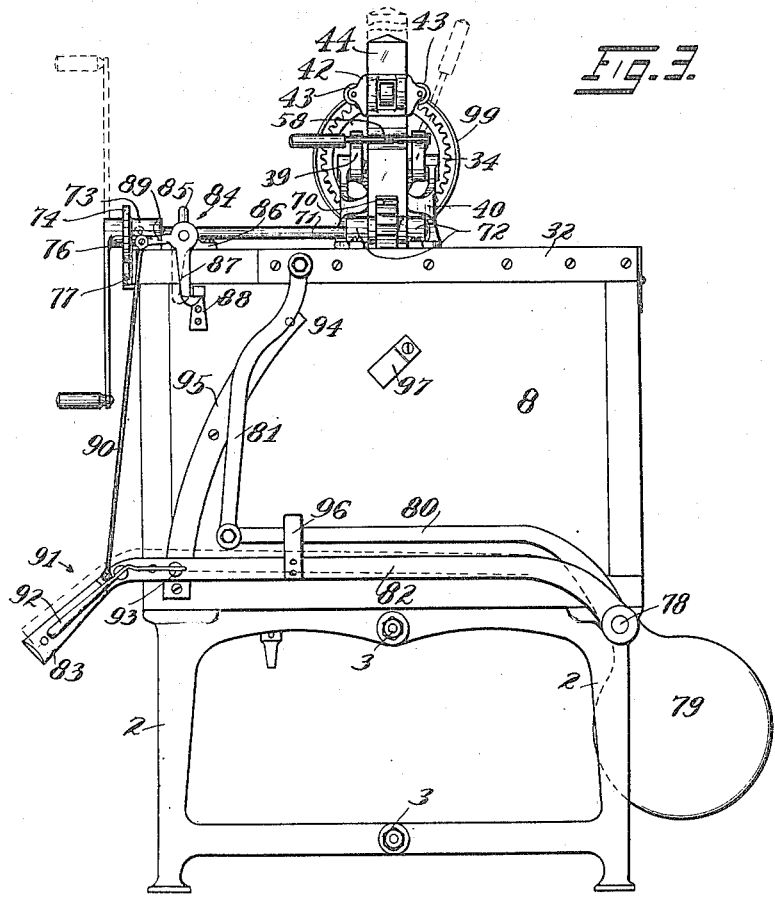
Figure 14:
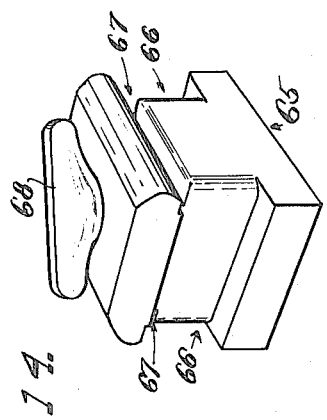
Figure 15:
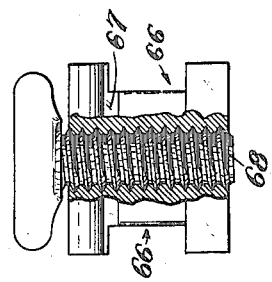
Figure 13:
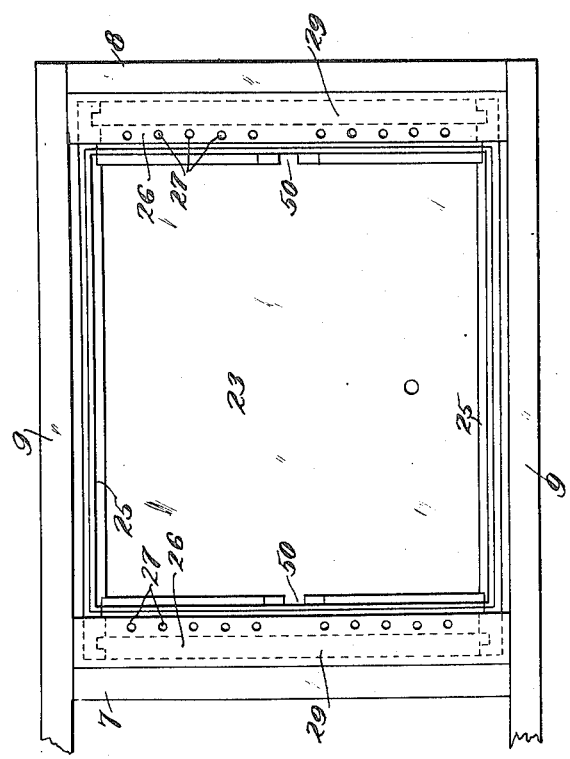

Figure 1 is a plan view of the apparatus. Fig. 2 is a side elevation of the same. Fig. 3 is an end elevation of the same with the cover in closed position. Fig. 4 is a fragmentary end elevation of the same showing the cover in raised position. Fig. 5 is a longitudinal section of the apparatus along the lines $x^5$—$x^5$ of Fig. 1. Fig. 6 is a fragmentary transverse section showing the interior of the etching chamber which section is taken along the line $x^6$—$x^6$ of Fig. 1. Figs. 7, 8, and 9 are transverse sections showing the interior of the etching chamber with the plunger at three successive positions respectively of its operation, viz: before descending toward the liquid, in contact with the liquid, and after withdrawing from the liquid. Fig. 10 is a fragmentary detail in section showing the arrangement of passages for permitting gaseous substance such as air to enter the etching chamber. Figs. 11 and 12 are fragmental details showing the spring connections respectively between the lever for locking the movable support of the plunger operating in the etching chamber with the actuatable mechanism. Fig. 13 is a fragmental plan view showing the interior of the etching chamber with the cover and plunger removed. Fig. 14 is a perspective view of one of the attaching blocks detached. Fig. 15 is an elevational view of one of the attaching blocks with a part thereof broken off.

In the embodiment shown, there is provided a platform 1 supported by two brackets 2, 2 secured to the platform 1 at one end thereof which brackets are secured to one another by tie rods 3, 3, one connecting the upper ends of the brackets 2 and the other connecting the lower ends of such brackets. The platform 1 forms the base for two housings, the motor housing 4, and the housing 5 for the etching chamber. The motor housing 4 is shown at the left hand side of Figs. 1, 2 and 5, especially Fig. 5, and comprises a left hand end wall 6 and a right hand end wall 7 which wall 7 incidentally also forms the left hand end wall of the etching chamber 5, the wall 7 it will be noticed being of slightly greater altitude than the wall 6, and corresponds in height to the right hand end wall 8 of the housing 5 for the etching chamber which is at the right hand end of the platform 1. The housings 4 and 5 have common rear and front walls 9, which walls 9 are of slightly greater altitude where they inclose the housing 5. The front wall 9 is provided with a screen door 10 at the left hand side thereof and permits access to the interior of the motor housing 4, this screen door being of such fabrication that it will permit circulation of air to the motor and yet prevent dust from passing therethrough. The housing 4 is provided with a rigid roof member 11 having an opening 12 therethrough for the passage of the chain drive 13 passing around the gear 14 on the shaft 15 of the motor 16 positioned in the housing 4, and also passing around the gear 17 mounted on the shaft 18 journaled in the bracket 19 positioned on the roof member 11 of the housing 4, the shaft 18 having a spur gear 20 at one end thereof which is adjacent to the wall 7. The motor 16 can be supplied with current from any suitable source of supply by means of the main 21.

The etching chamber in the housing 5 is equipped for withstanding the corrosive effects of the chemical action to take place therein, for which purpose, in the present instance, there are positioned on the platform 1 and transversely thereof four joists 22 suitably spaced from one another to properly support a base for the etching chamber which in the present instance is a soapstone 23 having channeled recesses 24 in its upper surface and along its borders to receive the offsets formed at the lower edges of the four soapstones 25 forming the side and end walls of the etching chamber which soapstones 25 are suitably connected to one another to form tight joints. The spaces between the joists 22 are filled with paraffin 26'. Furthermore, the joists 22 and the walls 7, 9, 8, and 9, are spaced from the soapstones 23 and 25, in which spaces paraffin 27' is disposed. The soapstones are provided since they are unaffected by the chemical action which takes place in such etching chamber, and at the same time form rigid walls for such etching chamber while the paraffin fillers are provided as a liquid proof substance to guard against any of the liquid oozing through the soapstones and contacting with the walls 7, 8 and 9 and the platform 1, which latter if composed of wood would be liable to corrode from such chemical action.

Formed adjacent to the end walls 7 and 8, and resting on the upper edges of the soapstones 25 adjacent to such walls 7 and 8 are disposed ventilating members 26 (Figs. 10 and 13), provided with a series of openings 27 passing entirely through one portion of such members 26, namely, the overhanging portions 28 thereof which openings 27 communicate at their lower ends with the lateral chambers 29 formed between the soapstones 25 and the partitioning soapstones 30 which are disposed adjacent to such end soapstones 25 clear across the etching chamber, but each having an opening 31 at its lower end, the upper end of which is spaced from the soapstone 23, a distance slightly in excess of the height of liquid to be maintained in such etching chamber. This latter arrangement is provided in order to permit gaseous substance such as air to pass in through openings 27, through the chambers formed between the end soapstones 25 and the partitioning soapstones 30, and then through such openings 31 into the etching chamber.

Forming one of the main parts of the present invention is the construction and arrangement of the cover 32 now to be described in conjunction with the forementioned apparatus. This cover 32 is hinged to the rear wall 9 and extends completely across the upper edge of the front wall 9 and the upper edges of the end walls 7 and 8. At the left end of the cover 32 there is positioned a bracket 33 in the upper end of which is journaled a shaft having at one end fixed thereto a gear 34 which is in mesh with the spur gear 20 on the shaft 18 when the cover is in closed position. At the other end of the shaft disposed in this bracket 33 is fixed a crank wheel 35 having a stud 36 disposed in its right hand face near the periphery of the crank wheel, in the end of which is rotatably mounted a bar 37 which is operatively disposed in the bifurcated end 38 of a lever bracket 39 fulcrumed at its middle end to a bracket 40 disposed substantially in the middle of the cover 32, which bracket 40 has an upwardly extending portion 41 formed into a box-shaped guide 42 provided with guide rollers 43 adjacent the walls of such box-shaped guide 42, between which guide rollers 43, the upper end of the plunger rod 44 is disposed to travel, which plunger rod 44 in the present instance is quadrilateral in cross section, so that it can be fixed in its movement by this box-shaped guide 42. The cover 32 is provided with an opening 45 in alinement with the opening between the guide rolls 43 and through which opening 45 the plunger rod 44 is disposed to reciprocate. At the lower end of the plunger rod 44 is secured a metallic plate supporting member 46 comprising an upper backing member 47 and a lower attaching member 48. At each of the ends of said backing member 47, there is provided a lug 49 disposed to travel in a groove 50 formed in its adjacent partitioning soapstone 30. These grooves 50 as shown in Fig. 6 spread out at their upper ends so as to permit the lugs 49 to readily be guided into position in such grooves 50 when the cover 32 is being closed, and of course to prevent binding when the cover 32 is being opened. The attaching member 48 is provided in the present instance with laterally extending dovetail slots 51 by means of which the metallic plates to be etched will be secured in place as will hereinafter be described.

To protect the lower side of the cover member 32 from the etching liquid in the liquid chamber, there is secured to such lower side the vulcanized rubber covering member 52 which is provided with an opening in its middle portion to permit the passage of the plunger rod 44 and which has flanges 53 around its edges, the front and rear flanges 53 (Fig. 6) of which resting in the seats 54 formed at the upper ends of the front and rear soapstones 25 while the lateral flanges 53 (Fig. 5) of which lie adjacent to the upper ends of the partitioning soapstones 30 when the cover is in closed position.

To prevent dripping of the liquid from the cover when being opened, there is provided a rubber curtain 55, see Fig. 5, which is secured to the rubber flange 53, this curtain 55 being suspended in the etching chamber a sufficient distance to fully cover up the space that would be formed between the rear edge of the cover 32 and the upper edge of the rear wall 9 when the cover 32 is disposed in raised position.

The plunger 44 is shown in the present instance reciprocated by means of the lever bracket 39, the bifurcated right hand end 56 of which is formed to receive the plunger rod 44. The ends of the arms 57 of such bifurcated end 56 are also each bifurcated, the rear arm 57 as shown in Fig. 11 having pivotally mounted in such bifurcated end a locking bar 58, the end of which is provided with a lateral extension 59 to be engaged by the spring 60 secured to such arm 57, so that the locking bar 58 may be locked in closed position, the full line position shown in Fig. 11 in which case the elongated side of the extension 59 will be flush with the spring 60, and also in its open position in which the short side of the extension 59 will be flush with the spring 60. When the locking bar 58 is in closed position, its free end will be disposed in the bifurcated end of the front arm 57 in which it may be locked by the spring pressed pin 61 shown in Fig. 12. The plunger rod 44 is provided with a transversely extending groove 62 in its right hand face into which groove 62 the locking bar 58 will be disposed when in closed position by which arrangement, the plunger rod 44 will be attached to the lever bracket 39 to be reciprocated thereby.

In the cover 32 near each lateral end thereof, there is provided a series of openings 63, which when in closed position of the cover 32 will be staggered with respect to the openings 27 in the ventilating members 26, but communicating with such openings 27 by means of their outspreading lower portions 64 as clearly shown in Fig. 10. By this arrangement, it will be seen that gaseous substance such as air, will have free access to such openings 27, and that, due to their staggered relation any splashing of the liquid in such etching chamber will be deflected by the walls of the enlarged portions 64 and thus be prevented from splashing out through the cover 32.

The metallic plates P to be treated will be secured to the lower surface of the attaching member 48 by means of the attaching blocks 65. The attaching blocks are each provided with large grooves 66 parallel with one another to form a dovetail construction and substantially at the lower ends of such large grooves 66, there are provided narrow grooves 67 which are provided to receive the plate P to be treated, and passing centrally through each of such blocks 65, there is provided a screw-threaded opening to receive the binding screw 68. When attaching a plate to the attaching member 48, there is provided one of these blocks 65 at each of the lateral sides of the plate P, the blocks 65 being secured to the attaching member 48 by being slid into the dovetail slots 51 in the usual manner, preferably three such blocks being first positioned, then the plate P slid into the narrow grooves 67 of the blocks 65 and thereupon the fourth block 65 slid into position so that one of its narrow grooves 67 engages one of the edges of the plate P. It will be seen from the foregoing, by referring to Figs. 7, 8 and 9, that the plate P will thus be disposed flat against the lower surface of the attaching member 48 and thus have a substantial backing. The block 65 will then be frictionally secured in place by tightly drawing the binding screws 68. These blocks 65 are in the present instance composed of celluloid which composition withstands the attack of the chemical action of the etching chamber and forms strong and rigid constructions particularly adapted for the present purpose.

When it is desired to remove the metallic plate P, that has been treated, from the etching chamber, the plunger rod 44 is first disconnected from the lever bracket 39, and thereupon it is necessary that the plunger be raised to its uppermost position before the cover 32 can be opened. To so raise this plunger rod 44, one side of the same is provided with a rack 69 shown in Fig. 5 which may be engaged by a mutilated gear 70 fixed on a shaft 71 between bearings 72, 72 in which the shaft 71 is journaled, the shaft being additionally journaled in the bearing 73 positioned at the front end of the cover 32. The shaft 71 extends beyond the front end of the cover 32 on which end a disk 74 is fixed having two notches 75 in its periphery disposed one diametrically opposite the other, and a handle 76 secured on the outer side of this disk 74.

On the front edge of the cover 32, there is pivotally mounted a dog 77 spring-pressed against the periphery of the disk 74 which dog 77 has a rearward extension 78 by means of which the dog can be withdrawn from engagement with the disk 74, the dog 77 being provided to engage into the notches 75 to lock the mutilated gear 70 in idle position. The arrangement is such that the mutilated side of the gear 70 will be disposed adjacent to the rack 69 to permit the free movement of the rack 69 with the plunger rod 44 when not engaging the gear 70, in which non-engaging position, one of the notches 75 will be engaged by the dog 77 and thereby lock such gear 70 in such non-engaging position. When the plunger rod 44 has been disconnected from the lever 39, then the dog 77 may be disengaged from the notch 75 with which it is in engagement, and thereupon the handle 76 turned so that the active part of the gear 70 will engage the rack 69 and raise the plunger rod 44, the relation between the rack and the gear being such that the plunger rod 44 will be raised into its uppermost position by the aforesaid active portion of such gear 70, in which raised position, the other notch 75 of the disk 74 will be in position to be engaged by the dog 77 and thus lock the gear 70 and with it the plunger rod 44 in raised position.

For raising the cover 32, a novel arrangement has been provided. Along the lower rear edge of the platform 1, and secured in the brackets 2, 2, there is provided a shaft 78 on which is fixed a counterweight 79, and fixed to the shaft 78 and extending forwardly along the lower edges of the walls 7 and 8 and outside of the etching chamber, there are provided two levers 80, each pivotally connected by a link 81 which is pivotally connected to one of the lateral edges of the cover 32. On the right hand side of the lever 80 adjacent to the wall 8, there is fixed to the shaft 78 another lever 82 having a handle 83 at its front end extending downwardly. By raising this handle 83, the shaft 78 will be turned, by which means levers 80 and links 81 will raise the cover 32, the counterweight 79 facilitating the operation.

For locking the cover 32 in closed position, there are provided latches 84 disposed one at each lateral edge of the cover 32 and pivotally mounted on the shaft 85 mounted in bearings 86 disposed on the front upper end of the cover 32, each of the latches 84 having a depending hook portion 87 to engage a lug 88 one disposed on each of the walls 7 and 8 respectively outside of the etching chamber. The latch 84 adjacent to the wall 8 has in addition a forwardly extending portion 89 at the free end of which it is pivotally connected by a link 90 with the handle 83. Thus when the handle 83 is raised to raise the cover, it will thrust upwardly the extension 89 thereby rocking the shaft 85 which in turn withdraws the latches 84 out of engagement with the lugs 88 to release the cover 32.

For locking the lever 82 in its lower position, there is provided a lever 91 fulcrumed on the handle 83 having a handle portion 92 to be grasped simultaneously with the handle 83, and a pin 93 at its other end which extends through an opening in the lever 82. In the path of movement of this pin 93, there are provided two pin openings 94, in the present instance, these pin openings being formed in a curved plate 95 attached to the wall 8, one of the pin openings 94 being provided at the lower end of the plate 95 to be engaged by the pin 93 when the lever 82 is in lower position and the other pin opening 94 being provided at the upper end of the plate 95 to be engaged by the pin 93 when the lever 82 is in raised position or open position of the cover 32. This lever 91 is spring-pressed so that its pin normally extends outwardly but will be retracted when the handle portion 92 is pressed toward the handle portion 83. To serve as a guide for maintaining the lever 82 adjacent to the wall 8 so as to insure engagement of the pin 93 in the pin opening 94 at the upper end of the plate 95, there is provided a laterally extending portion 96 on the lever 82 which is adapted to glide under and be positioned under the offset portion 97 secured to the wall 8 when the lever 82 is in raised position. This laterally extending portion 96 incidentally also serves to guide the lever 80 adjacent to the wall 8.

As shown in Fig. 2, the gear 17 (Fig. 5) is provided with a suitable hood 98 attached to the roof member 11; and the gear 34 (Fig. 5) fixed to move with the cover 32 is provided with a suitable hood 99 which has a downwardly and outwardly extending portion 100 to cover the spur gear 20 when the cover 32 is in lower or closed position, but which outwardly extending portion 100 of the hood 99 permits the hood to be raised with the cover 32.

The operation of the apparatus and process is as follows: The etching chamber is filled with liquid to a height a trifle below the upper edges of the openings 31 at the lower ends of the partitioning soapstones 30. While the cover 32 is in an open or raised position, the plunger rod 44 being disconnected from the lever bracket 39, and maintained in raised position by the mutilated gear 70, the metallic plates to be treated are attached to the attaching member 48. Thereupon the cover is lowered into closed position, the handle 76 turned to lower the plunger rod 44; thereupon the lever bracket 39 connected to the plunger rod 44; the gear 34 having in the meantime come into mesh with the spur gear 20; and thereupon the power turned on. Through the train of gears and lever bracket connection with the plunger rod 44, the plunger rod 44 will be reciprocated up and down so that the plate P be immersed into the liquid in the etching chamber or come into contact with such liquid and be removed therefrom, and this operation be repeated with the lowering and raising of the plunger rod 44. By means of the air passages 63, the openings 27, through the chambers 29 formed between the end soapstones 25 and the partitioning soapstones 30 and then through the openings 31, free passage of gaseous substance such as air is permitted so that when the plunger is lowered, the air may quickly be forced out, and again when the plunger is raised the vacuum to be created will be quickly filled up by the inrushing air, which operation will tend to shear off the liquid which might adhere to the plate P and thus make it possible to secure an equal distribution of force or impact of the liquid over the face of the entire plate and thereby secure an even chemical action when the plunger 44 is operated at a high rate of reciprocation without in any way impairing the chemical action.

It is obvious from the foregoing that without the air chambers, the etching acid, in exact portion to its velocity and viscosity would contact with and follow the plate on an upward movement of the reciprocation greatly adding to the load carried by the reciprocating mechanism and producing an undesirable agitation in said fluid, and as I have found in practice, thereby tending to cause the acid to cut the plate to uneven depths in various parts of the plate. It is therefore evident that an ideal condition would be produced if it were possible to maintain the fluid in an absolutely still condition, its surface being flat and parallel to the impacting plate, so that the dynamic force and chemical action would be supplemental to one another and be equal over the entire surface of the plate. As this absolute quiet condition of fluid under the system used by me cannot be obtained, it is evident that the quicker the fluid is permitted to settle into the quiet state, the more efficient a machine will be under this process and such action is readily obtained by the previously set forth method of permitting the action of the influx and ingress of air, the said amount being controlled by the reciprocating motion of the carrier and plate in such a manner that the inrushing air creates a counteracting force tending to shear the fluid more rapidly from the plate, thereby giving it more time between impacts or reciprocations to settle in order to produce more nearly the required surface flatness of etching bath.

I claim:

1. An apparatus for etching metallic plates comprising a housing forming an etching chamber, a support in said housing to which a sensitized plate may be attached, said housing containing a chemical bath, means for reciprocating said support to convey said sensitized plate into contact with said bath and to remove it therefrom, there being bent air passages having deflecting surfaces directed toward the bath, said air passages permitting the free passage of air into said housing so as to shear off the liquid from the plate when the plate is being withdrawn from the bath and to fill up the vacuum tended to be created by such withdrawal, and to permit the quick escape of the air therefrom when the plate is descending so as to facilitate the unhampered descent of the plate, the bent passages and deflected surfaces preventing the outward splashing of any of the liquid in said housing.

2. An apparatus for etching metallic plates comprising a housing forming an etching chamber, a support in said housing to which the sensitized plate may be attached, said housing containing a chemical bath, means for reciprocating said support to convey said sensitized plate into contact with said bath and to remove it therefrom, there being air passages from said housing to permit the free passage of air into and out of said housing, a cover forming one of the walls of said housing when in closed position and hinged in place, and a curtain attached to said cover and positioned to hang over its hinged joint when said cover is in open position to prevent any of the liquid of said bath to drip out of said housing.

3. An apparatus for etching metallic plates comprising a housing forming an etching chamber, a cover forming the roof of said housing when in closed position, a support attached to said cover to which a sensitized plate may be attached, said housing containing a chemical bath, means for reciprocating said support to convey said sensitized plate into contact with said bath and to remove it therefrom, there being air passages through said cover along the side of the path of movement of said support to permit the free passage of air into said housing so as to shear off the liquid from the plate when the plate is being withdrawn from the bath and to fill up the vacuum tended to be created by such withdrawal, and to permit the quick escape of the air therefrom when the plate is descending so as to facilitate the unhampered descent of the plate.

4. An apparatus for etching metallic plates comprising a housing forming an etching chamber, a cover forming the roof of said housing when in closed position, ventilating means provided in said housing in the upper ends of the side walls of such housing adjacent to said cover and provided with a series of openings, there being a series of openings in said cover in staggered relation to the openings in said ventilating means when said cover is in closed position to permit the free passage of air into and out of said housing, and due to the staggered relation of the two series of openings, splashing of the liquid out of the bath is prevented.

5. An apparatus for etching metallic plates comprising a housing forming an etching chamber, a cover forming the roof of said housing when in closed position, ventilating means provided in said housing adjacent to said cover and provided with a series of openings, there being a series of openings in said cover in staggered relation to the openings in said ventilating means when said cover is in closed position to permit the free passage of air into and out of said housing, and due to the staggered relation of the two series of openings, the splashing of the liquid out of the bath being prevented, a support attached to said cover to which a sensitized plate may be attached, said housing containing a chemical bath, and means for reciprocating said support to convey said sensitized plate into and out of contact with said bath, said ventilating means being disposed along the side of the path of movement of said support.

6. An apparatus for etching metallic plates comprising a housing for containing a chemical bath and forming an etching chamber and having a floor and side walls, joists disposed transversely of said floor and spaced from one another, paraffin filled in the spaces between said joists, a soapstone disposed on said joists and forming the floor of an etching chamber, soapstones disposed edgewise on the border of said floor soapstone and joined to one another to form the side walls of the etching chamber, and paraffin disposed between the walls of the housing and the side wall soapstones, the soapstones resisting the action of the chemical bath, and the paraffin serving to obstruct the passage of any escaping liquid from the bath to the side walls of the housing.

7. An apparatus for etching metallic plates comprising a housing for containing a chemical bath and forming an etching chamber and having a floor and side walls, joists disposed transversely of said floor and spaced from one another, paraffin filled in the spaces between said joists, a soapstone disposed on said joists and forming the floor of the etching chamber, soapstones disposed edgewise on the border of said floor soapstone and joined to one another to form the side walls of the etching chamber, paraffin disposed between the walls of the housing and the side wall soapstones, partitioning soapstones disposed edgewise on said floor soapstone and adjacent to opposite side wall soapstones, said partitioning soapstones extending clear across said etching chamber, there being openings in the lower ends of said partitioning soapstones of an altitude slightly greater than the level of liquid of said bath, a cover forming the roof of said etching chamber, and there being openings through said cover affording communications into the lateral chambers formed between the partitioning soapstones and the adjacent side wall soapstones, from which lateral chambers the air may pass into the etching chamber through the openings at the lower ends of said partitioning soapstones.

8. An apparatus for etching metallic plates comprising a housing for containing a chemical bath and forming an etching chamber and having a floor and side walls, joists disposed transversely of said floor and spaced from one another, paraffin filled in the spaces between said joists, a soapstone disposed on said joists and forming the floor of an etching chamber, soapstones disposed edgewise on the border of said floor soapstone and joined to one another to form the side walls of the etching chamber, paraffin disposed between the walls of the housing and the side wall soapstones, the soapstones resisting the action of the chemical bath, and the paraffin serving to obstruct the passage of any escaping liquid from the bath to the side walls of the housing.

9. An apparatus for etching metallic plates comprising a housing for containing a chemical bath and forming an etching chamber and having a floor and side walls, joists disposed transversely of said floor and spaced from one another, paraffin filled in the spaces between said joists, a soapstone disposed on said joists and forming the floor of the etching chamber, soapstones disposed edgewise on the border of said floor soapstones and joined to one another to form the side walls of the etching chamber, paraffin disposed between the walls of the housing and the side wall soapstones, partitioning soapstones disposed edgewise on said floor soapstone and adjacent to opposite side wall soaptones, said partitioning soapstones extending clear across said etching chamber, there being openings in the lower ends of said partitioning soapstones of an altitude slightly greater than the level of liquid of said bath, a cover forming the roof of said etching chamber, there being openings through said cover affording communications into the lateral chambers formed between the partitioning soapstones and the adjacent side wall soapstones, from which lateral chambers the air may pass into the etching chamber through the openings at the lower ends of said partitioning soapstones.

10. An apparatus for etching metallic plates comprising a housing for containing a chemical bath and forming an etching chamber and having a floor and side walls, joists disposed transversely of said floor and spaced from one another, paraffin filled in the spaces between said joists, a soapstone disposed on said joists and forming the floor of the etching chamber, soapstones disposed edgewise on the border of said floor soapstone and joined to one another to form the side walls of the etching chamber, paraffin disposed between the walls of the housing and the side wall soapstones, partitioning soapstones disposed edgewise on said floor soapstone and adjacent to opposite side wall soapstones, said partitioning soapstones extending clear across said etching chamber, there being openings in the lower ends of said partitioning soapstones of an altitude slightly greater than the level of liquid of said bath, a cover forming the roof of said etching chamber, there being openings through said cover affording communications into the lateral chambers formed between the partitioning soapstones and the adjacent side wall soapstones, from which lateral chambers the air may pass into the etching chamber through the openings at the lower ends of said partitioning soapstones.

11. In an apparatus for etching metallic plates, a housing for containing a chemical bath and forming an etching chamber having a floor and side walls, partitioning members extending clear across said etching chamber and adjacent to opposite side walls, openings in the lower ends of said partitioning members of an altitude slightly greater than the level of liquid of said bath, a cover forming the roof of said etching chamber, there being openings through said cover affording communications into the lateral chambers formed between the partitioning members and the adjacent side walls, from which lateral chambers the air may pass into the etching chamber through the openings at the lower ends of said partitioning members.

12. In an apparatus for etching metallic plates, a housing for containing a chemical bath and forming an etching chamber having a floor and side walls, partitioning members extending clear across said etching chamber adjacent to two opposite side walls, there being openings in the lower ends of said partitioning members of an altitude slightly greater than the level of liquid in said bath, a ventilating member disposed on the top of each partitioning member and having a series of openings therein affording communication into the lateral chamber formed between its adjacent partitioning member and side wall, a cover forming the roof of said etching chamber, there being openings through said cover in staggered relation to the openings in said ventilating members whereby air may pass through said cover into the lateral chambers formed between the adjacent partitioning members and side walls, and from there into said etching chamber through the openings at the lower ends of said partitioning members, the staggered relation of the openings in the cover and ventilating members preventing the outward splashing of liquid from said etching chamber.

13. In an apparatus for etching metallic plates, a housing for containing a chemical bath and forming an etching chamber having a floor and side walls, partitioning members extending clear across said etching chamber adjacent to two opposite side walls, there being openings in the lower ends of said partitioning members of an altitude slightly greater than the level of liquid in said bath, a ventilating member disposed on the top of each partitioning member and having a series of openings therein affording communication into the lateral chamber formed between its adjacent partitioning member and side wall, a cover forming the roof of said etching chamber, there being openings through said cover in staggered relation to the openings in said ventilating members, the lower ends of the openings in said cover being enlarged to communicate with the openings in said ventilating members, whereby air may pass through said cover into the lateral chambers formed between the adjacent partitioning members and side walls, and from there into said etching chamber through the openings at the lower ends of said partitioning members, the staggered relation of the openings in the cover and ventilating members preventing the outward splashing of liquid from said etching chamber.

14. In an apparatus for etching metallic plates, a housing for containing a chemical bath and forming an etching chamber having a floor and side walls, partitioning members extending clear across said etching chamber and adjacent to opposite side walls, there being openings in the lower ends of said partitioning members of an altitude slightly greater than the level of liquid of said bath, and a cover forming the roof of said etching chamber, there being openings through said cover affording communications into the lateral chambers formed between the partitioning members and the adjacent side walls, from which lateral chambers the air may pass into the etching chamber through the openings at the lower ends of said partitioning members.

15. In an apparatus for etching metallic plates, a housing for containing a chemical bath and forming an etching chamber having a floor and side walls, partitioning members extending clear across said etching chamber and adjacent to opposite side walls, a cover forming the roof of said etching chamber, hingedly connected to one of the side walls of said housing which is perpendicular to said partitioning members, there being vertically extending grooves medially disposed in the opposing faces of said partitioning members, a support reciprocating through said cover, said support comprising a plunger, an attaching plate secured to the inner plate of said plunger to which the plate to be etched is secured; and lugs on the ends of the attaching plate traveling in said grooves whereby to guide said attaching plate and plunger in its reciprocation, the upper ends of the vertically extending grooves gradually enlarging in an upward direction to facilitate the location of said lugs when the cover is being closed and to prevent binding when the cover is being raised.

16. In an apparatus of the class described, a housing forming an etching chamber, a cover for said housing and hinged to said housing, a support attached to said cover to which a sensitized plate may be attached, said housing containing a chemical bath, actuatable means mounted on said cover and connected to said support and adapted to be driven to reciprocate said support to convey said sensitized plate into and out of contact with said bath, a rock shaft mounted on one end of said housing, a counterweight on said shaft, links connecting said rock shaft with said cover so that said counterweight will facilitate the raising of said cover, a lever fixed to said rock shaft and extending forwardly, a handle at the forward end of said lever whereby to grasp said lever to raise it and thereby rock the rock shaft and thus raise the cover, and means for locking said lever in lowered or raised position.

17. In an apparatus of the class described, a housing forming an etching chamber, a cover for said housing and hinged to said housing, a support attached to said cover to which a sensitized plate may be attached, a rock shaft mounted on one end of said housing, a counterweight on said shaft, links connecting said rock shaft with said cover so that said counterweight will facilitate the raising of said cover, a main lever fixed to said rock shaft and extending forwardly, a handle at the forward end of said lever whereby to grasp said lever to raise it and thereby rock the rock shaft and thus raise the cover, and means for locking said lever in lowered or raised position, said locking means comprising an auxiliary lever fulcrumed to said main lever and having a handle to one side of its fulcrum point and a pin at the other side of its fulcrum point, there being a pin opening in said main lever, there also being orifices adjacent to the path of movement of said pin when being raised with said lever into which orifices said pin may engage to lock said lever in position.

18. In an apparatus of the class described, a housing forming an etching chamber, a cover for said housing and hinged to said housing, a support attached to said cover to which a sensitized plate may be attached, a rock shaft mounted on one end of said housing, a counterweight on said shaft, links connecting said rock shaft with said cover so that said counterweight will facilitate the raising of said cover, a main lever fixed to said rock shaft and extending forwardly, a handle at the forward end of said lever whereby to grasp said lever to raise it and thereby rock the rock shaft and thus raise the cover, and means for locking said main lever in lowered or raised position, said means comprising an auxiliary lever fulcrumed to the handle of said main lever and having a handle to one side of its fulcrum point and a pin on the other side of its fulcrum point, there being a pin opening in said main lever, spring means for normally extending said pin through said pin opening, and a plate along the path of movement of said pin when being raised with said main lever, there being an orifice at the upper end of said plate and another orifice at the lower end of said plate into which orifices the pin extends to lock the main lever and thereby the cover either in raised or lowered positions.

19. In an apparatus of the class described, a housing forming an etching chamber, a cover for said housing and hinged to said housing, a support attached to said cover to which a sensitized plate may be attached, a rock shaft mounted on one end of said housing, a counterweight on said shaft, links connecting said rock shaft with said cover so that said counterweight will facilitate the raising of said cover, a main lever fixed to said rock shaft and extending forwardly, a handle at the forward end of said lever whereby to grasp said lever to raise it and thereby rock the rock shaft and thus raise the cover, and means for locking said main lever in lowered or raised position, said means comprising an auxiliary lever fulcrumed to the handle of said main lever and having a handle to one side of its fulcrum point and a pin on the other side of its fulcrum point, there being a pin opening in said main lever, spring means for normally extending said pin through said pin opening and a plate along the path of movement of said pin when being raised with said main lever, there being an orifice at the upper end of said plate and another orifice at the lower end of said plate into which orifices the pin extends to lock the main lever and thereby the cover either in raised or lowered positions, a lateral extending finger formed on said main lever and an opposedly extending projection secured to the side wall of said housing so positioned that said finger will ride under said projection when the main lever is in raised position and there maintain said main lever crowded against said side wall substantially as described.

20. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, actuatable means mounted on said cover and connected to said plunger and adapted to be driven to reciprocate said plunger to convey said sensitized plate into and out of contact with said bath, said actuatable means comprising a bearing bracket, a lever bracket fulcrumed in said bearing bracket, means for connecting one end of said lever bracket with said plunger, a bearing at one end of said cover, a shaft mounted in said bearing, an eccentric on said shaft having a loose connection with the other end of said lever, a gear fixed to said shaft, and driving means disposed on said housing but free of said cover and adapted to engage said gear when said cover is in closed position to drive said gear.

21. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, actuatable means mounted on said cover and connected to said plunger and adapted to be driven to reciprocate said plunger to convey said sensitized plate into and out of contact with said bath, said actuatable means comprising a bearing bracket, a lever bracket fulcrumed in said bearing bracket, means for connecting one end of said lever bracket with said plunger, a bearing at one end of said cover, a shaft mounted in said bearing, an eccentric on said shaft having a loose connection with the other end of said lever, a gear fixed to said shaft, driving means disposed on said housing but free of said cover and adapted to engage said gear when said cover is in closed position to drive said gear, and a hood disposed over said gear and having lower outwardly extending flanges to permit raising of said hood with said cover.

22. In an apparatus of the class described, a housing forming an etching chamber, a cover hinged to said housing to form the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, an actuatable means mounted on said cover and connected to said plunger and adapted to be driven to reciprocate said plunger to convey said sensitized plate into and out of contact with said bath, said actuatable means comprising a bearing bracket, a lever bracket fulcrumed to said bearing bracket, a box-shaped guide formed in said bearing bracket, rollers in said box-shaped guide, a plunger reciprocating in said box-shaped guide and operating against said rollers, means for connecting one end of said lever bracket with said plunger, a bearing at one end of said cover, a shaft mounted in said bearing, an eccentric on said shaft having a loose connection with the other end of said lever, and means for driving said shaft.

23. In an apparatus of the class described, a housing forming an etching chamber, a cover hinged to said housing to form the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, an actuatable means mounted on said cover and connected to said plunger and adapted to be driven to reciprocate said plunger to convey said sensitized plate into and out of contact with said bath, said actuatable means comprising a bearing bracket, a lever bracket fulcrumed to said bearing bracket, a box-shaped guide formed in said bearing bracket, rollers in said box-shaped guide, said plunger reciprocating in said box-shaped guide and operating against said rollers, there being a slot in said plunger, a locking lever hinged to one end of said lever bracket and adapted to be swung into said slot, means for locking said locking lever in closed position, means for locking said lever in open position, and driving means for operating said lever to reciprocate said plunger when said lever is connected to said plunger.

24. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, an actuatable means on said cover and connected to said plunger and adapted to be driven to reciprocate said plunger to convey said sensitized plate into and out of contact with said bath, said actuatable means being adapted to be disconnected from said plunger when the cover is to be raised, and means for raising said plunger when said actuatable means are disconnected thereby to permit said attaching plate to clear the said etching chamber when the cover is raised.

25. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, actuatable means on said cover and connected to said plunger and adapted to be driven to reciprocate said plunger to convey said sensitized plate into and out of contact with said bath, said actuatable means being adapted to be disconnected from said plunger when the cover is to be raised, and means for raising said plunger when said actuatable means are disconnected thereby to permit said attaching plate to clear the said etching chamber when the cover is raised, said raising means comprising a rack fixed to one side of said plunger, a mutilated gear mounted in said cover and adapted when desired to have its active portion engage said rack thereby to raise said plunger, a shaft on which said mutilated gear is mounted, and a lever for turning said shaft to operate said mutilated gear.

26. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said mousing containing a chemical bath, an actuatable means on said cover and connected to said plunger and adapted to be driven to reciprocate said plunger to convey said sensitized plate into and out of contact with said bath, said actuatable means being adapted to be disconnected from said plunger when the cover is to be raised, and means for raising said plunger when said actuatable means are disconnected thereby to permit said attaching plate to clear the said etching chamber when the cover is raised, said raising means comprising a rack fixed to one side of said plunger, a mutilated gear mounted in said cover and adapted when desired to have its active portion engage said rack thereby to raise said plunger, a shaft on which said mutilated gear is mounted, a lever for turning said shaft to operate said mutilated gear, and means for locking said shaft in two positions, one where the cover is raised and the other where the cover is closed.

27. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, and actuatable means on said cover and connected to said plunger and adapted to be driven to reciprocate said plunger to convey said sensitized plate into and out of contact with said bath, said actuatable means being adapted to be disconnected from said plunger when the cover is to be raised, and means for raising said plunger when said actuatable means are disconnected thereby to permit said attaching plate to clear the said etching chamber when the cover is raised, said raising means comprising a rack fixed to one side of said plunger, a mutilated gear mounted in said cover and adapted when desired to have its active portion engage said rack thereby to raise said plunger, a shaft on which said mutilated gear is mounted, a lever for turning said shaft to operate said mutilated gear, means for locking said shaft in two positions, one where the cover is raised and the other where the cover is closed, said locking means comprising a disk fixed to said shaft and having notches therein, and a spring pressed dog for engaging said notches to lock said disk in the position desired.

28. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, actuatable means on said cover connected to said plunger and adapted to be driven to reciprocate said plunger to convey said attaching plate into and out of contact with said chemical bath, a rock shaft mounted at one end of said housing, links connecting said rock shaft with said cover, a lever fixed to said rock shaft and extending forwardly by means of which the rock shaft may be actuated to operate said links to raise said cover, means for locking said cover in closed position, and a link connecting said lever with said locking means whereby the actuation of said lever will release said locking means.

29. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, an actuatable means on said cover connected to said plunger and adapted to be driven to reciprocate said plunger to convey said attaching plate into and out of contact with said chemical bath, a rock shaft mounted at one end of said housing, links connecting said rock shaft and extending forwardly by means of which the rock shaft may be actuated to operate said links to raise said cover, means for locking said cover in closed position, said means comprising a lug fixed to the side wall of said housing, a latch pivotally mounted on said cover and adapted to engage said lug when in closed position to lock said cover, an extension on said latch, and a link connecting said extension with said lever so that the extension of said lever will rock said latch to release said lug and thereby permit the cover to be raised.

30. In an apparatus of the class described, a housing forming an etching chamber, a cover hinged to said housing and forming the roof of said etching chamber when in closed position, there being an opening through said cover, a plunger reciprocatingly mounted in said opening, an attaching plate secured to the lower end of said plunger to which the sensitized plate to be treated may be attached, said housing containing a chemical bath, actuatable means on said cover connected to said plunger and adapted to be driven to reciprocate said plunger to convey said attaching plate into and out of contact with said chemical bath, a rock shaft mounted at one end of said housing, links connecting said rock shaft with said lever, a lever fixed to said rock shaft and extending forwardly by means of which the rock shaft may be actuated to operate said links to raise said cover, means for locking said cover in closed position, said means comprising lugs fixed to the side walls of said housing, a shaft extending across said cover, latches fixed to said shaft and adapted to engage said lugs when the cover is in closed position to lock said cover, and a link connecting said lever with said shaft so that the actuation of said lever will rock said shaft thereby rocking said latches to release said lugs and permit the raising of said cover.

31. In an apparatus of the class described, a housing forming an etching chamber, a support in said housing to which the sensitized plate to be treated may be attached, said housing containing a chemical bath, means for reciprocating said support to convey said sensitized plate into and out of contact with said bath, and a vulcanized rubber covering member on the inner side of said cover to protect the same from the chemical action of the etching liquid in said etching chamber, said covering member having downwardly extending flanges to engage the side walls of the etching chamber.

32. In an apparatus of the class described, the combination with a platform, a housing on one portion of said platform forming an etching chamber, a second housing on another portion of said platform forming a motor receiving chamber, a motor in said second housing, a cover hinged to said first housing and forming the roof of the etching chamber, there being an opening in said cover, a plunger reciprocatingly mounted in said opening, an attaching plate secured to the lower end of said plunger to which the sensitized plate to be treated may be attached, a shaft on the second housing, a spur gear fixed to said shaft, connecting means for connecting said shaft with the motor, a bearing bracket on said cover, a shaft mounted in said bearing bracket, a gear fixed on one end of said shaft, an eccentric on the other end of said shaft, and means connecting said eccentric with said plunger thereby to operate said plunger, said gear on said cover and said spur gear on said second housing being disposed to mesh with one another when the cover is in closed position thereby to transmit motion to said plunger.

33. An apparatus for etching metallic plates comprising a housing forming an etching chamber, a support in said housing to which the sensitized plate may be attached, said housing containing a chemical bath, means for reciprocating said support to convey said sensitized plate into contact with said bath and to remove it therefrom, a cover forming one of the walls of said housing when in closed position and hinged in place, and a curtain attached to said cover and positioned to hang over its hinged joint when said cover is in open position to prevent any of the liquid of said bath to drip out of said housing.

34. An apparatus for etching metallic plates comprising a housing for containing a chemical bath and forming an etching chamber having a floor and side walls, partitioning members disposed edgewise on said floor and adjacent to opposite side walls, a cover forming the roof of said etching chamber hingedly connected to one of the walls of said housing which is perpendicular to said partitioning members, a support in said etching chamber to which a sensitized plate may be attached, said support comprising a plunger, there being an opening through said cover in which said cover reciprocates, an attaching plate secured to the inner end of said plunger, means for securing the sensitized plate to said attaching plate, there being vertically extending grooves medially disposed in the opposing faces of said partitioning members, and lugs on the ends of the attaching plate traveling in said grooves whereby to guide said attaching plate in its reciprocation.

35. In an apparatus for etching metallic plates, a housing for containing a chemical bath and forming an etching chamber having a floor and side walls, partitioning members extending across said etching chamber to opposite side walls, a cover forming the roof of said etching chamber and hingedly connected to one of the side walls of said housing which is perpendicular to said partitioning members, there being vertically extending grooves medially disposed in the opposing faces of said partitioning members, a support reciprocated through said cover, said support comprising a plunger, an attaching plate secured to the inner end of said plunger to which the plate to be etched is secured, and lugs on the ends of the attaching plate traveling in said grooves whereby to guide said attaching plate and plunger in its reciprocation, the upper ends of the vertically extending grooves gradually enlarging in an upward direction to facilitate the location of said lugs when the cover is being closed and to prevent binding when the cover is being raised.

ROBERT R. PAGE.

Witnesses:
H. D. PENNEY,
GUSTAV DREWS.